(12) United States Patent
Engels et al.

(10) Patent No.: US 11,870,180 B2
(45) Date of Patent: Jan. 9, 2024

(54) ELECTRIC PLUG-IN DEVICE AND ARRANGEMENT HAVING AN ELECTRIC PLUG-IN DEVICE

(71) Applicants: Siemens Energy Global GmbH & Co. KG, Munich (DE); PFISTERER KONTAKTSYSTEME GMBH, Winterbach (DE)

(72) Inventors: Engelbert Engels, Cologne (DE); Tim Schnitzler, Kreuzau (DE); Thomas Friedel, Schorndorf-Miedelsbach (DE)

(73) Assignees: Siemens Energy Global GmbH & Co. KG, Munich (DE); Pfisterer Kontaktsysteme GmbH, Winterbach (DE)

( * ) Notice: Subject to any disclaimer, the term of this patent is extended or adjusted under 35 U.S.C. 154(b) by 390 days.

(21) Appl. No.: 17/291,691

(22) PCT Filed: Oct. 17, 2019

(86) PCT No.: PCT/EP2019/078137
§ 371 (c)(1),
(2) Date: May 6, 2021

(87) PCT Pub. No.: WO2020/094352
PCT Pub. Date: May 14, 2020

(65) Prior Publication Data
US 2022/0006232 A1  Jan. 6, 2022

(30) Foreign Application Priority Data
Nov. 6, 2018 (DE) .......................... 102018218879.3

(51) Int. Cl.
*H01R 13/53* (2006.01)
*H01F 27/04* (2006.01)
(Continued)

(52) U.S. Cl.
CPC ............. *H01R 13/53* (2013.01); *H01F 27/04* (2013.01); *H01R 13/502* (2013.01); *H01R 13/621* (2013.01)

(58) Field of Classification Search
CPC .... H01R 13/53; H01R 13/502; H01R 13/621; H01R 13/5219; H01F 27/04; H02G 15/06
See application file for complete search history.

(56) References Cited

U.S. PATENT DOCUMENTS 3,800,064 A * 3/1974 Lusk .................... H02G 15/064
174/71 R
7,517,242 B2 * 4/2009 Brodersen ............. H01J 35/165
439/488

(Continued)

FOREIGN PATENT DOCUMENTS

DE         1092090 B      11/1960
DE         2410625 A1      9/1975
(Continued)

*Primary Examiner* — Abdullah A Riyami
*Assistant Examiner* — Nelson R. Burgos-Guntin
(74) *Attorney, Agent, or Firm* — Laurence A. Greenberg; Werner H. Stemer; Ralph E. Locher

(57) ABSTRACT

An electric plug-in device, which is suitable for plugging into an electric receiving device, has an inner conductor and an insulating body that encloses the inner conductor. The plug-in device includes a retaining element which can be firmly connected indirectly, in particular with the help of a housing wall, or directly to the receiving device; a sliding element which can be moved axially along a longitudinal axis of the inner conductor relative to the retaining element includes the internal conductor and the insulating body. When the plug-in device is plugged into the receiving device, the sliding element protrudes into a receiving portion of the receiving device. A spring device exerts an axially (Continued)

active spring force on the sliding element in the direction of the receiving device when the plug-in device is plugged into the receiving device.

15 Claims, 3 Drawing Sheets

(51) Int. Cl.
*H01R 13/502* (2006.01)
*H01R 13/621* (2006.01)

(56) References Cited

U.S. PATENT DOCUMENTS

| | | | |
|---|---|---|---|
| 9,680,251 B2* | 6/2017 | Haferl | H01R 13/6215 |
| 2003/0236023 A1* | 12/2003 | Jazowski | H01R 13/53 |
| | | | 439/488 |
| 2006/0084315 A1* | 4/2006 | Brodersen | H01R 13/53 |
| | | | 439/470 |
| 2008/0166911 A1* | 7/2008 | Siebens | H01R 13/631 |
| | | | 439/488 |
| 2011/0189887 A1* | 8/2011 | Borgstrom | H01R 13/53 |
| | | | 439/488 |

FOREIGN PATENT DOCUMENTS

| | | |
|---|---|---|
| DE | 4239648 A1 | 6/1994 |
| DE | 4425421 C1 | 2/1996 |
| DE | 19508973 A1 | 9/1996 |
| DE | 102007022641 A1 | 11/2008 |
| EP | 0671061 B1 | 6/1996 |
| EP | 0732791 A1 | 9/1996 |
| EP | 3174165 A1 | 5/2017 |
| EP | 3185365 A1 | 6/2017 |

* cited by examiner

ELECTRIC PLUG-IN DEVICE AND ARRANGEMENT HAVING AN ELECTRIC PLUG-IN DEVICE

BACKGROUND OF THE INVENTION

Field of the Invention

The invention relates to an electric plug-in device which is suitable for plugging into an electric receiving device and has an inner conductor and an insulating body which encloses the inner conductor. The electric plug-in device can be, for example, a high-voltage bushing which can be plugged in, and the electric receiving device can be an apparatus connection part of an electrical apparatus.

In general, a high-voltage bushing has the task of insulating a high-voltage line, which is at high-voltage potential and has a current-conducting current conductor, from an environment that is substantially at ground potential, for example an apparatus wall of the high-voltage installation. Such a high-voltage bushing is known, for example, from DE 10 2007 022 641 A1. Said document discloses a transformer, the housing of which has an apparatus connection part, into which a high-voltage bushing can be plugged for connection of the transformer to a high-voltage network. The use of such a high-voltage bushing which can be plugged in makes it possible to construct and to commission the transformer with the high-voltage bushing with as little outlay on installation as possible.

SUMMARY OF THE INVENTION

The invention is based on the object of specifying a plug-in device with which the risk of an electrical breakdown in the contact region between the electric plug-in device and the electric receiving device is particularly low.

This object is achieved according to the invention by an electric plug-in device having the features as claimed. Advantageous refinements of the plug-in device according to the invention are specified in dependent claims.

It is accordingly provided according to the invention that the plug-in device has: a retaining element which can be fixedly connected indirectly, in particular with the aid of a housing wall, or directly to the receiving device, a sliding element which is displaceable axially along a longitudinal axis of the inner conductor relative to the retaining element and comprises the inner conductor and the insulating body, wherein, when the plug-in device is plugged into the receiving device, the sliding element protrudes into a receiving section of the receiving device, and a spring device which, when the plug-in device is plugged into the receiving device, exerts an axially acting spring force on the sliding element in the direction of the receiving device.

A substantial advantage of the plug-in device according to the invention can be seen in the fact that the spring device which is provided according to the invention and presses the sliding element in the direction of the receiving device makes it possible for an insulating material, which is located between the insulating body of the sliding element and the receiving device, to be brought into close contact both with the insulating body of the plug-in device and with the receiving device such that an airgap can be avoided between the insulating body and the receiving device and the risk of electrical arcing due to an airgap in this region is minimized.

A further advantage of the plug-in device according to the invention consists in that the spring device can absorb expanding or shrinking of the insulating material mentioned in the event of temperature fluctuations: if, for example, the insulating material expands, the spring device can yield and can permit the required increase in volume; in the event of a temperature reduction or shrinking of the insulating material, the spring device can press the sliding element further into the receiving device, can reduce the volume for the insulating material and can avoid formation of a gap.

The insulating material can be attached to the inner wall of the receiving device; however, it is considered to be particularly advantageous if the insulating material is attached to the insulating body. In the last-mentioned variant, the insulating material therefore forms an outer layer of the sliding element, which outer layer is situated on the insulating body.

In an advantageous manner, the insulating material can be attached fixedly to the insulating body of the sliding element, in particular can be sprayed thereon; alternatively, it can be pushed releasably onto the insulating body of the sliding element. In the last-mentioned variant, the insulating material can be exchanged particularly simply in the event of wear.

The insulating material is preferably a plastically and/or elastically deformable material. It is particularly advantageous if the insulating material is silicone material or at least also contains the latter.

The sliding element preferably has a pusher section with a pressure surface which extends radially outward, as seen from the inner conductor (preferably at an angle or inclined with respect to the longitudinal direction of the inner conductor, in particular perpendicularly to the longitudinal direction of the inner conductor), and lies laterally on the insulating material.

The pusher section is preferably formed by a ring which is placed onto the insulating body and the ring surface of which facing away from the retaining element or facing the receiving device forms the pressure surface.

The pusher section or the pressure surface thereof preferably lies flat on the insulating material.

The pusher section is preferably located between the insulating material and the retaining element and separates them from each other.

The surface normal of the pressure surface preferably lies parallel to the longitudinal axis of the inner conductor.

The pusher section preferably forms a flange section of the sliding element, which flange section revolves in a rotationally symmetrical manner about the longitudinal axis of the inner conductor.

The pusher section is preferably connected to a bearing part which is arranged within a sleeve section, which is connected to the retaining element or is formed integrally thereon, and is displaceable axially within the sleeve section along the longitudinal axis of the plug-in device or of the inner conductor.

The bearing part is preferably rotationally symmetrical about the longitudinal axis of the inner conductor.

In a particularly preferred refinement, it is provided that the sleeve section, as seen along the longitudinal axis, has at least a first partial section with a first diameter and a second partial section with a second diameter which is larger than the first diameter, the movable bearing part is displaceable within the second partial section, and the spring device or at least a compression spring of the spring device is arranged at least in sections between a radial stop surface of the sleeve section, which stop surface lies between the first and second partial section, and the movable bearing part and is supported on the stop surface.

The plug-in device is preferably a high-voltage bushing which can be plugged in. The sliding element is preferably configured in such a manner that it can be pushed into an apparatus connection part of an electrical apparatus.

The insulating body is preferably a casting resin body.

The casting resin body preferably comprises cast-in field-controlling control inserts which are separated from one another by insulating layers which are likewise cast in (for example made of PET nonwoven fabric). The control inserts are preferably arranged concentrically around the inner conductor.

The insulating body preferably tapers conically in the direction of the receiving device.

It is advantageous if the insulating material is formed by a silicone cone, the inner boundary layer of which rests on the insulating body and the outer boundary layer of which lies on the inner wall of the receiving device after the plug-in device has been plugged into the receiving device.

The insulating material is preferably rotationally symmetrical about the longitudinal axis of the inner conductor.

The invention also relates to an arrangement having a plug-in device, as has been described above, and a receiving device, into which the plug-in device is pushed.

Furthermore, the invention relates to an arrangement having an electrical apparatus with a fluid-tight housing. The apparatus has an apparatus connection part which is inserted into an opening in the housing. A plug-in device, as has been described above, is plugged into the apparatus connection part and connected by its inner conductor to a contact device of the apparatus connection part.

BRIEF DESCRIPTION OF THE SEVERAL VIEWS OF THE DRAWING

The invention will be explained in more detail below with reference to exemplary embodiments; by way of example here

DETAILED DESCRIPTION OF THE INVENTION

In the figures, for the sake of clarity, identical or comparable components are always provided with the same reference signs.

Figure 1:
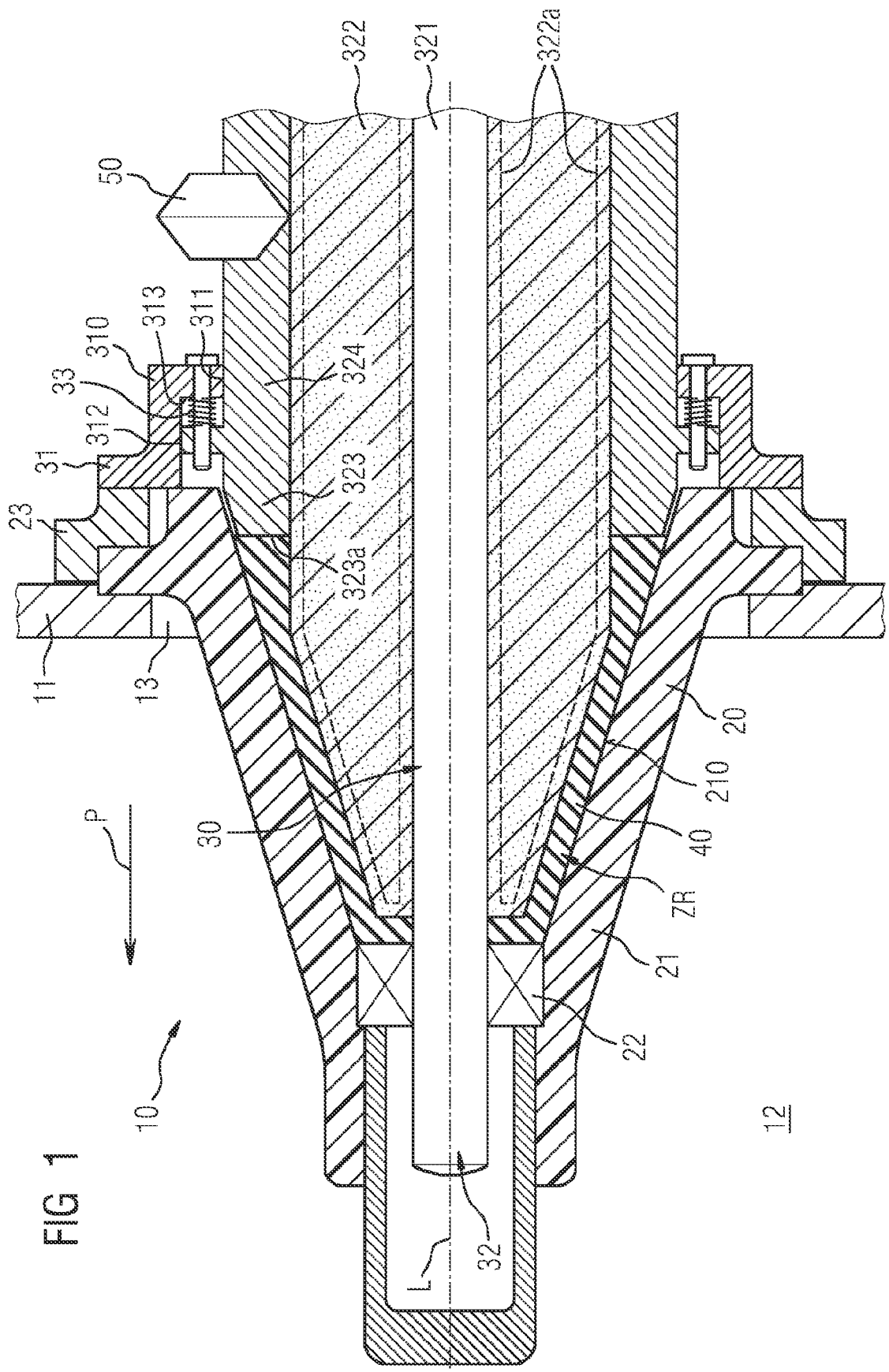
FIG. 1 shows an exemplary embodiment of a plug-in device in which an insulating material is sprayed fixedly onto an insulating body.

FIG. 1 shows a section of an exemplary embodiment of an electrical apparatus 10, which is preferably a transformer. The apparatus 10 has a housing wall 11 which delimits an interior 12 of the apparatus 10. Electrical components, not illustrated specifically, of the apparatus 10 and an insulating oil are located in the interior 12.

The housing wall 11 is provided with an opening 13 which is closed in a fluid-tight manner by an electric receiving device 20 which forms an electric apparatus connection part of the apparatus 10.

The receiving device 20 comprises an electrically insulating insulating section 21 (preferably made of casting resin) and a contact system 22. The contact system 22 is connected to at least one electrical component of the electric apparatus 10 via lines, not illustrated in detail further.

In the illustration according to FIG. 1, a plug-in device 30 in the form of a high-voltage bushing which can be plugged in and serves for making contact with the at least one electrical component of the electric apparatus 10 is pushed into the receiving device 20. The plug-in device 30 comprises a retaining element 31, a sliding element 32 and a spring device 33.

The retaining element 31 serves for fastening the plug-in device 30 to fastening means 23 of the receiving device 20 after the sliding element 32 of the plug-in device 30 has been pushed into the receiving device 20. Alternatively or additionally, the plug-in device 30 can also be attached, in particular screwed, to the housing wall 11.

The sliding element 32 comprises an inner conductor 321 which, when the plug-in device 30 is plugged in, makes electrical contact with or is connected electrically to the contact system 22 of the receiving device 20. The inner conductor 321 is enclosed by an insulating body 322 which tapers conically or converges conically in the direction of the contact system 22 of the receiving device 20.

The insulating body 322 is preferably a casting resin body. The casting resin body comprises control inserts which are not illustrated further for reasons of clarity and of which, for example, one or more can be connected to measurement connections 50. The control inserts are preferably arranged concentri¬cally around the inner conductor 321 and are separated from one another by insulating layers (e.g. made of PET nonwoven fabric), which are not illustrated further.

The insulating body 322 is particularly preferably a body made of resin-impregnated paper. The inserted control inserts just do not reach as far as the surface of the insulating body, this being depicted pictorially by means of a separating line 322a in the insulating body 322.

Between the insulating body 322 of the sliding element 32 and an inner wall 210 of the insulating section 21 of the receiving device 20, when the sliding element 32 is plugged in, there is a gap-shaped intermediate space which is filled with a plastically and/or elastically deformable insulating material 40. In the exemplary embodiment according to FIG. 1, the insulating material 40 is attached fixedly to the insulating body 322, in particular is sprayed thereon, and thus forms part of the sliding element 32. The insulating material 40 is preferably a silicone material.

In the exemplary embodiment according to FIG. 1, the sliding element 32 furthermore has a pusher section 323 which forms a flange section of the sliding element 32 and revolves in a rotationally symmetrical manner about the longitudinal axis L of the inner conductor 321.

It is considered to be particularly advantageous if the pusher section 323 has a pressure surface 323a which extends radially outward, as seen from the inner conductor 321, and is adjacent to the insulating material 40. In the exemplary embodiment according to FIG. 1, the orientation of the pressure surface 323a is selected in such a manner that the surface normal of the pressure surface 323a lies parallel to the longitudinal axis L of the inner conductor 321.

The pusher section or flange section 323 can be formed by a ring which is placed onto the insulating body 322 and is fixedly connected thereto and the ring surface of which facing away from the retaining element 31 and facing the receiving device 20 forms the pressure surface 323a.

FIG. 1 also reveals that the plastically and/or elastically deformable insulating material 40 preferably forms a conical, pot-like element which has an inner surface resting on the insulating body 322, an outer surface lying on the inner wall 210 of the receiving device 20, a front surface located at the front end of the insulating body 322, and a rear surface which is remote from the front surface and extends radially outward. The pusher section 323 which pushes the insulating material 40 forward in the direction of the front surface lies on the rear radial surface.

In the exemplary embodiment according to FIG. 1, a bearing part 324 of the sliding element 32 is also attached fixedly to the insulating body 322.

As shown by way of example in FIG. 1, the bearing part 324 and the pusher section 323 of the sliding element 32 can be formed by a single component. Alternatively, they can be formed by two separate parts which lie on one another; in the case of this last-mentioned variant, the pusher section 323 can be formed by a ring which rests on the insulating body 322 and lies on the bearing part 324.

The bearing part 324 is preferably arranged within a sleeve section 310 of the retaining element 31 and is displaceable axially within the sleeve section 310—along the longitudinal axis L of the inner conductor 321 or the longitudinal axis of the sliding element 32. The bearing part 324 is preferably rotationally symmetrical about the longitudinal axis L of the inner conductor 321.

The bearing part 324 and the sleeve section 310 of the retaining element 31 form a plain bearing in which the bearing part 324 is movable.

It is advantageous if the sleeve section 310 has a first subsection 311 and a second subsection 312, as seen along the longitudinal axis L. The second subsection 312 is larger in terms of diameter than the first subsection 311 and serves for receiving the bearing part 324 of the sliding element 32. A radial stop surface 313 which separates the two subsections 311 and 312 from each other serves for supporting the spring device 33, which pushes the bearing part 324 and therefore the sliding element 32 as a whole along the arrow direction P into the receiving device 20.

The compressive force of the spring device 33 leads to the pusher section 323 and the conical section of the insulating body 322 that is adjacent to the insulating material 40 pressing the insulating material 40 firmly onto the inner wall 210 of the receiving device 20 and to the intermediate space ZR between the insulating body 322 and the insulating section 21 of the receiving device 20 being filled with the insulating material 40 without an airgap remaining. The risk of electrical arcing in the region of the intermediate space ZR is thereby considerably reduced.

The spring device 33 preferably comprises at least three compression springs arranged in a rotationally symmetrical manner around the longitudinal axis L of the inner conductor 321.

Figure 2:
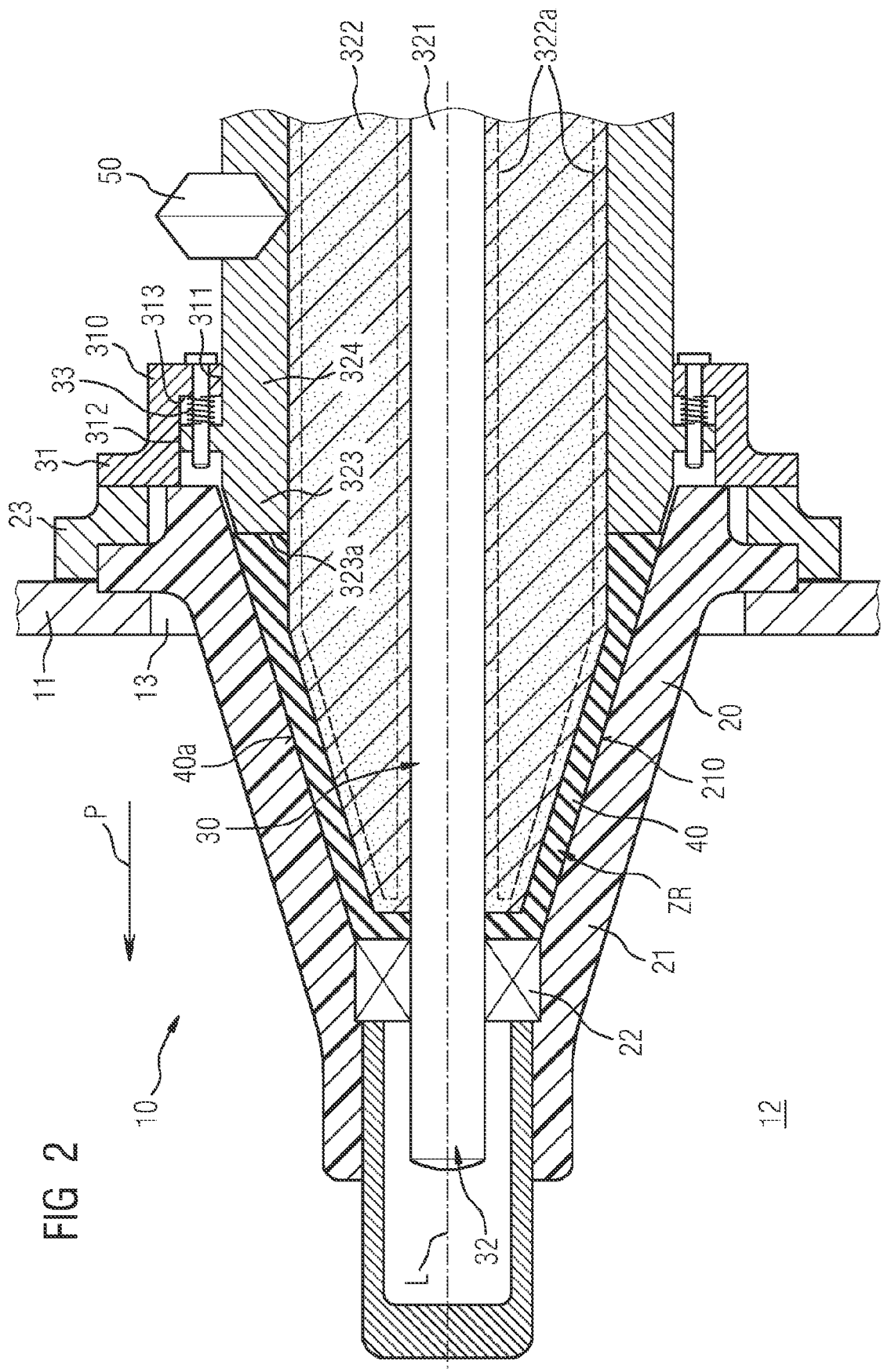
FIG. 2 shows an exemplary embodiment of a plug-in device according to the invention in which a separate insulating element made of insulating material is pushed onto an insulating body of the plug-in device.

FIG. 2 shows an exemplary embodiment of a plug-in device 30 which substantially corresponds in terms of its structure to the plug-in device 30 according to FIG. 1. However, in contrast to the exemplary embodiment according to FIG. 1, in the case of the plug-in device 30 according to FIG. 2 insulating material is not sprayed onto the insulating body 322; instead, a separate tube- or sleeve-shaped insulating element 40a is provided which is composed of insulating material 40, tapers conically and is pushed onto the insulating body 322. In the configuration according to FIG. 2, it is thus possible to replace the insulating material 40 after possible wear by the insulating element 40a being removed from the insulating body 322 and being replaced by a new insulating element 40a.

The insulating element 40a is preferably rotationally symmetrical about the longitudinal axis L of the inner conductor 321.

Otherwise, the statements in conjunction with FIG. 1 apply correspondingly.

Figure 3:
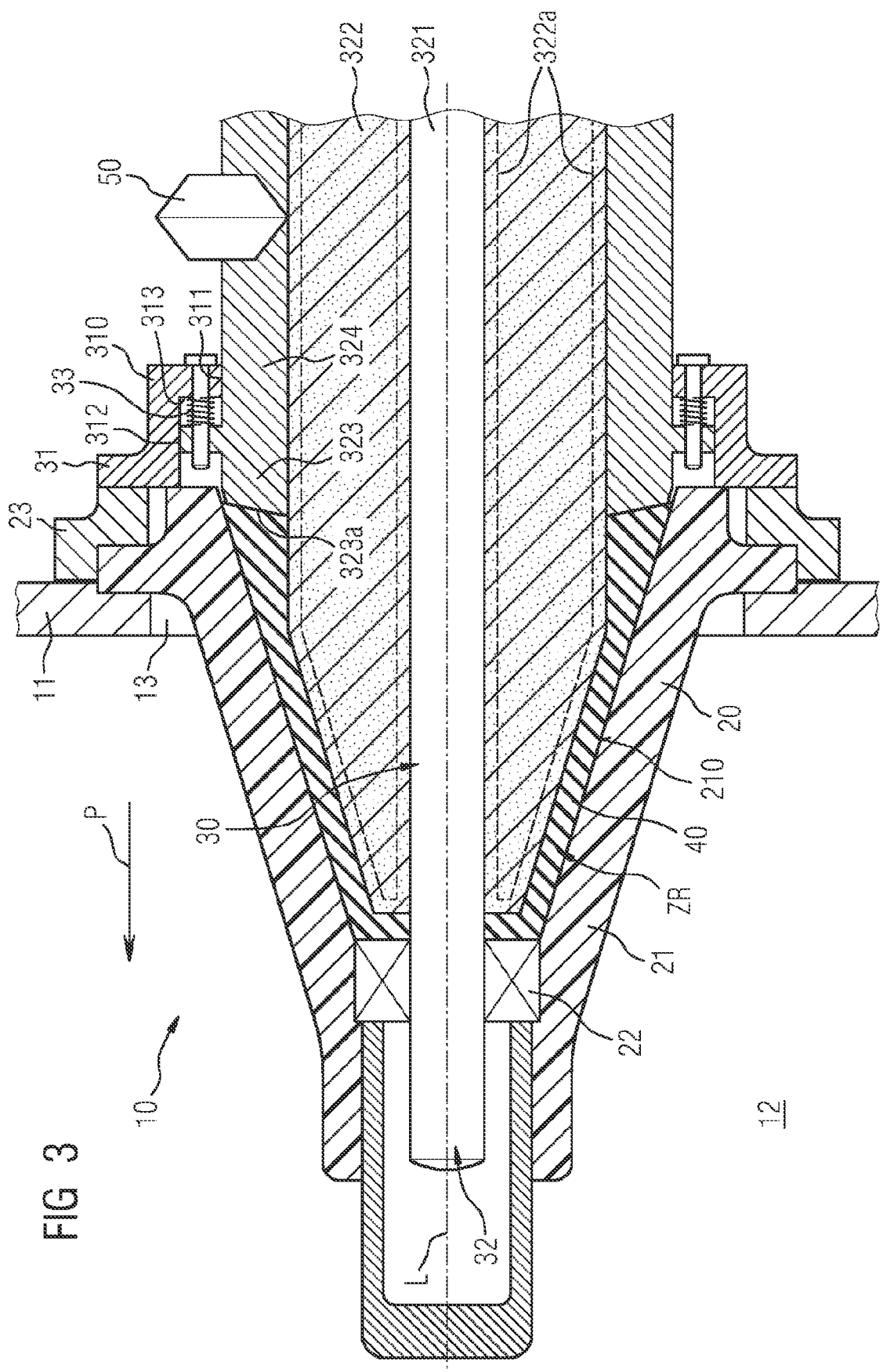
FIG. 3 shows an exemplary embodiment of a plug-in device according to the invention in which a pressure surface is arranged at a non-perpendicular angle with respect to the axis of rotation of the inner conductor.

FIG. 3 shows an exemplary embodiment of a plug-in device 30 according to the invention, in which the pressure surface 323a of the pusher section 323 is arranged at an angle of between 45° and 90°, preferably at an angle of between 60° and 80° with respect to the longitudinal axis L of the inner conductor 321. The pressure surface 323a is preferably tilted away rearward, i.e. away from the contact system 22 and the front tip of the inner conductor 321. Such an angle or such an orientation of the pressure surface 323a is particularly advantageous for field-electric reasons.

Otherwise, the statements in conjunction with FIG. 1 and FIG. 2 apply correspondingly.

Although the invention has been illustrated and described in detail by preferred exemplary embodiments, the invention is not restricted to the examples that have been disclosed and other variations can be derived therefrom by a person skilled in the art without departing from the scope of protection of the invention.

LIST OF REFERENCE SIGNS

10 Apparatus
11 Housing wall
12 Interior
13 Opening
20 Receiving device
21 Insulating section
22 Contact system
23 Fastening means
30 Plug-in device
31 Retaining element
32 Sliding element
33 Spring device
40 Insulating material
40a Insulating element
50 Measurement connection
210 Inner wall
310 Sleeve section
311 Subsection
312 Subsection
313 Stop surface
321 Inner conductor
322 Insulating body
322a Separating line
323 Pusher section
323a Pressure surface
324 Bearing part
L Longitudinal axis
P Arrow direction
ZR Intermediate space

The invention claimed is:

1. An electric plug-in device for plugging into an electric receiving device, the plug-in device comprising:
    an inner conductor having a longitudinal axis and an insulating body enclosing said inner conductor, said inner conductor and said insulating body forming a sliding element;
    an insulating material fixedly attached to said insulating body or pushed releasably onto said insulating body;
    a retaining element to be fixedly connected to the receiving device;

said sliding element being axially displaceable along the longitudinal axis of said inner conductor relative to said retaining element, wherein said sliding element projects into a receiving section of the receiving device when the plug-in device is plugged into the receiving device;

said sliding element further including a pusher section with a pressure surface that extends radially outward, as seen from said inner conductor, and lies in contact on said insulating material; and a spring device configured to exert an axially acting spring force on said sliding element in a direction of the receiving device when the plug-in device is plugged into the receiving device.

2. The electric plug-in device according to claim 1, wherein said retaining element is directly affixed to the receiving device or said retaining element is indirectly connected to the receiving device via a housing wall.

3. The electric plug-in device according to claim 1, wherein said insulating material is sprayed onto said insulating body.

4. The electric plug-in device according to claim 1, wherein said insulating material is a plastically and/or elastically deformable material.

5. The electric plug-in device according to claim 1, wherein said insulating material is a silicone material.

6. The electric plug-in device according to claim 1, wherein a surface normal of said pressure surface lies parallel to the longitudinal axis of said inner conductor.

7. The electric plug-in device according to claim 1, wherein said pusher section forms a flange section of said sliding element, and said flange section revolves rotationally symmetrically about the longitudinal axis of said inner conductor.

8. The electric plug-in device according to claim 1, wherein said pusher section is connected to a bearing part which is arranged within a sleeve section, which is connected to said retaining element or is formed integrally thereon, and is displaceable axially within said sleeve section along the longitudinal axis of said inner conductor.

9. The electric plug-in device according to claim 8, wherein:

said sleeve section, along the longitudinal axis, has at least a first partial section with a first diameter and a second partial section with a second diameter that is larger than the first diameter;

said movable bearing part is displaceable within said second partial section; and said spring device, or at least a compression spring of said spring device, is arranged at least in sections between a radial stop surface of said sleeve section formed between said first and second partial sections, and said movable bearing part and is supported on said stop surface.

10. The plug-in device according to claim 1, configured as a high-voltage bushing, with said sliding element being configured to be pushed into an apparatus connection part of an electrical apparatus.

11. The plug-in device according to claim 1, wherein said insulating body comprises field-controlling control inserts separated from one another by insulating layers.

12. The plug-in device according to claim 11, wherein said control inserts are arranged concentrically around said inner conductor.

13. The electric plug-in device according to claim 1, wherein:

said insulating body tapers conically in a direction of the receiving device; and said insulating material is a silicone cone with an inner boundary layer resting on said insulating body and an outer boundary layer lying on an inner wall of the receiving device.

14. An arrangement, comprising:

a receiving device; and a plug-in device according to claim 1 pushed into said receiving device.

15. An arrangement, comprising:

an electrical apparatus having a fluid-tight housing and an apparatus connection part inserted into an opening formed in said housing, said apparatus connection part having a contact device; and a plug-in device according to claim 1 plugged into said apparatus connection part and being connected by way of the inner conductor to the contact device of said apparatus connection part.

* * * * *